United States Patent
Fjelde (10) Patent No.: US 11,505,996 B2
(45) Date of Patent: Nov. 22, 2022

(54) SYSTEM AND METHOD FOR POSITIONING A DRILLING RIG

(71) Applicant: Comrod AS, Tau (NO)

(72) Inventor: Ole Gunnar Fjelde, Tau (NO)

(73) Assignee: Comrod AS, Tau (NO)

(*) Notice: Subject to any disclaimer, the term of this patent is extended or adjusted under 35 U.S.C. 154(b) by 289 days.

(21) Appl. No.: 16/763,764

(22) PCT Filed: Nov. 16, 2018

(86) PCT No.: PCT/NO2018/050281
§ 371 (c)(1),
(2) Date: May 13, 2020

(87) PCT Pub. No.: WO2019/098852
PCT Pub. Date: May 23, 2019

(65) Prior Publication Data
US 2020/0284096 A1     Sep. 10, 2020

(30) Foreign Application Priority Data

Nov. 17, 2017   (NO) .................................... 20171835

(51) Int. Cl.
*E21B 7/02*     (2006.01)
*E21B 15/00*    (2006.01)
(Continued)

(52) U.S. Cl.
CPC ................ *E21B 7/024* (2013.01); *E21B 7/02* (2013.01); *E21B 15/006* (2013.01);
(Continued)

(58) Field of Classification Search
CPC ........ E21B 7/02; E21B 15/006; E21B 15/003; E21B 7/024; E02D 13/04; E02B 2017/0056; B60L 2200/40
See application file for complete search history.

(56) References Cited

U.S. PATENT DOCUMENTS

| | | | |
|---|---|---|---|
| 1,888,668 A | * | 11/1932 | Hossfeld ................. E21B 7/027 173/54 |
| 2,562,276 A | | 7/1951 | Kandle |

(Continued)

FOREIGN PATENT DOCUMENTS

| | | |
|---|---|---|
| CH | 662156 | 9/1987 |
| CN | 106089100 | 11/2016 |

(Continued)

OTHER PUBLICATIONS

Norwegian Search Report for NO 20171835, dated Jun. 16, 2018.
International Search Report and the Written Opinion for PCT/NO2018/050281, dated Jan. 23, 2019.

*Primary Examiner* — Nicole Coy
(74) *Attorney, Agent, or Firm* — Andrus Intellectual Property Law, LLP (57) ABSTRACT

A system and a method are for positioning a drilling rig arranged to drill in a ground. The system has a positioning jig including at least one coupling portion; a drilling rig including at least two coupling portions; and at least two anchoring elements including an upper coupling portion and a lower coupling portion. The lower coupling portion of the anchoring element is arranged to be releasably fixed to the ground. The upper coupling portion of the anchoring element is arranged to be connected to the coupling portion of the positioning jig and to the coupling portion of the drilling rig, so that the upper coupling portion of the anchoring element can optionally be connected to the positioning jig or the drilling rig.

20 Claims, 7 Drawing Sheets

(51) Int. Cl.
*E02B 17/00* (2006.01)
*E02D 13/04* (2006.01)

(52) U.S. Cl.
CPC ... *B60L 2200/40* (2013.01); *E02B 2017/0056* (2013.01); *E02D 13/04* (2013.01); *E21B 15/003* (2013.01)

(56) References Cited

U.S. PATENT DOCUMENTS

| | | | |
|---|---|---|---|
| 3,212,589 A | | 10/1965 | Wink |
| 3,568,779 A | | 3/1971 | Cannon |
| 4,591,296 A | * | 5/1986 | Henderson, Jr. ........ E02D 13/04 405/195.1 |
| 4,667,746 A | * | 5/1987 | Moraly ................ E02D 7/08 173/39 |
| 5,437,341 A | * | 8/1995 | Horn ................ E02F 3/3604 175/203 |
| 9,644,337 B1 | * | 5/2017 | Stiles ..................... E02D 7/30 |
| 2006/0266511 A1 | | 11/2006 | Wood |
| 2011/0030982 A1 | | 2/2011 | Ferrand |

FOREIGN PATENT DOCUMENTS

| | | |
|---|---|---|
| FR | 1028672 | 5/1953 |
| GB | 2467842 | 11/2013 |
| KR | 101205620 | 11/2012 |
| WO | 2009155639 | 12/2009 |

\* cited by examiner

SYSTEM AND METHOD FOR POSITIONING A DRILLING RIG

CROSS-REFERENCE TO RELATED APPLICATIONS

This application is the U.S. national stage application of International Application PCT/NO2018/050281, filed Nov. 16, 2018, which international application was published on May 23, 2019, as International Publication WO 2019/098852 in the English language. The International Application claims priority of Norwegian Patent Application No. 20171835, filed Nov. 17, 2017. The international application and Norwegian application are both incorporated herein by reference, in entirety.

FIELD

The invention relates to a system for positioning a drilling rig arranged to form a cut-out in a ground, the system comprising a positioning jig, a drilling rig and an anchoring element. The invention further relates to a method for positioning the drilling rig.

BACKGROUND

When forming a hole or a slot in a ground, for example in an outlying field or on a mountain, it is known to use a drilling rig which is attached to a vehicle, for example a lorry, an excavator or a cross-country vehicle, in this connection referred to as a mobile drilling rig. When the drilling rig is being moved to a construction site, the drilling rig is usually arranged in a horizontal position on the vehicle. At the construction site, the vehicle is positioned, and the drilling rig is raised to a vertical operative position. Before drilling, the drilling rig is adjusted in such a way that the center axis of the drill will have a desired angle to a ground plane, usually perpendicular to the ground. During drilling, the drill must usually be subjected to a vertical force which pushes the drill down into the ground. For a drilling rig attached to a vehicle, the necessary force may be provided by the weight of the drilling rig and vehicle.

Alternatively, a free-standing drilling rig may be used. By a free-standing drilling rig will be understood, here, a drilling rig which can be moved on a small trailer arranged to be pulled by a passenger car or a light cross-country vehicle, for example an ATV. The free-standing drilling rig may also be transported by a helicopter. The free-standing drilling rig is generally positioned manually, maybe by means of a small crane, a pulley lifting tackle or a winch. Because of low weight, the movable drilling rig must quite possibly be anchored to the ground, so that it can subject the drill to the necessary force towards the ground. The anchoring may, for example, be done by extending a chain or a rope from the top of the drilling rig to an anchoring attachment in the ground.

In an initial phase of the drilling, only a portion of the drill is generally in contact with the ground, and the drill may be subjected to great horizontal forces. A good sideways anchoring of the drilling rig may thereby be necessary.

Transport, positioning and anchoring of a free-standing drilling rig may be demanding, for example in a hilly terrain or on the mountain. When drilling far away from roads, it is common to use a helicopter to transport the drilling rig. Prior-art free-standing drilling rigs are usually provided with two or more supporting feet which are anchored to the ground. The supporting feet are preferably anchored to a mountain or a boulder by means of expanding dowels. Alternatively, the anchoring may comprise a strap, a chain, a turnbuckle or a combination of several elements.

If the rig is to be positioned over an unconsolidated ground, for example bog or moraine, a hole may first be formed, which is filled with concrete, and to which the drilling rig is then anchored. When at least one supporting foot has been anchored to the base, the drilling rig is adjusted in such a way that the center axis of the drill gets a correct angle to the ground plane, usually perpendicular. Then the other supporting feet may be positioned and secured to the ground. When the drilling rig has been secured sufficiently to the base and correctly positioned, the drilling may start.

The transport and positioning of a free-standing drilling rig may take several days. The drilling itself may often be carried out in a substantially shorter time, maybe within an hour by favourable ground conditions. There is a desire within the art to increase the service life of the drilling rig, and a simpler positioning of the drilling rig is considered an effective measure. A higher utilization of the drilling rig is particularly important when the drilling operation includes helicopter transport.

Patent document U.S. Pat. No. 2,562,276A discloses a mobile drilling rig comprising a frame arranged to stand supportingly against a base. A drilling device is arranged to be moved vertically along the frame, the drilling device including a handle arranged to give the drilling device a downward force.

Patent document WO2009155639A1 discloses a platform arranged to carry a drill for geological ground samples. The platform includes a plurality of supporting legs, wherein at least some of the supporting legs can be adjusted in length.

SUMMARY

The invention has for its object to remedy or reduce at least one of the drawbacks of the prior art or at least provide a useful alternative to the prior art.

The object is achieved through the features that are specified in the description below and in the claims that follow.

The invention is defined by the independent claims. The dependent claims define advantageous embodiments of the invention.

The invention relates to a system for positioning a drilling rig arranged to drill in a ground, the system comprising:
 a positioning jig including at least one coupling portion;
 a drilling rig including at least two coupling portions;
 at least two anchoring elements including an upper coupling portion and a lower coupling portion, wherein
 the lower coupling portion of the anchoring element is arranged to be releasably fixed to the ground; and
 the upper coupling portion of the anchoring element is arranged to be connected to the coupling portion of the positioning jig and to the coupling portion of the drilling rig, so that the upper coupling portion of the anchoring element can optionally be connected to the positioning jig or the drilling rig.

By providing a system according to the invention, it is possible to achieve a simpler positioning of a drilling rig, compared with the prior art. A prior-art drilling rig is typically anchored to the ground via one or more anchoring elements attached to the drilling rig. This requires the entire drilling rig to be positioned in the correct position before it may be secured. This is often a heavy and demanding operation, especially in hilly terrain.

The invention involves releasing the anchoring elements from the drilling rig and pre-positioning and fixing them to the ground by means of a positioning jig. Then the drilling rig is connected to the anchoring elements.

The coupling portion of the positioning jig and the coupling portion of the drilling rig are identical and correspond with an upper coupling portion belonging to the anchoring element. The coupling portions of the positioning jig and the drilling rig may be sleeves surrounding a portion of the upper coupling portion of the anchoring element. Alternatively, the coupling portion may include a profile, for example a U-profile.

The anchoring elements and the positioning jig may be of limited sizes and weights, making it possible for a person to carry them if necessary. The positioning jig is arranged to position the anchoring elements and not to absorb a load or a force. Thereby the positioning jig may be formed from a light material, for example aluminium.

When drilling is to take place, the anchoring elements and the positioning jig are transported to the construction site. The upper coupling portions of the anchoring elements are connected to the coupling portions of the positioning jig. The positioning jig is placed in a correct position and the lower coupling portions of the anchoring elements are fixed to the ground, for example by the use of a prior-art bolt connection. After the anchoring elements have been secured to the ground, the positioning jig is removed, and the anchoring elements are ready to receive and be attached to the drilling rig.

When the drilling rig arrives at the construction site, the drilling rig may immediately be connected to the secured anchoring elements and arranged in an approximately correct position. By the use of a helicopter, the drilling rig, for example, may be lowered directly onto the anchoring elements. Thereby, in a vulnerable terrain, the drilling rig may be positioned without temporary storage in the terrain. If the drilling rig is transported on the ground, it may be connected to the anchoring elements in a slanted or lying position.

The drilling rig must be positioned in two planes, a first sideways plane and a second longitudinal plane. The drilling rig described herein may be connected to two or more anchoring elements. If the drilling rig is arranged to be connected to two anchoring elements, the two anchoring elements may be arranged to position the drilling rig in the first plane. In the second plane, the drilling rig may be positioned with straps or brace rods. If the drilling rig is arranged to be connected to three anchoring elements, the three anchoring elements may be used to position the drilling rig in both the first and the second plane.

When the drilling has been carried out, the drilling rig may be disconnected from the anchoring elements and transported to the next site. When establishing a pylon line comprising a plurality of pylons, anchoring elements may advantageously be pre-positioned at several construction sites, so that the drilling rig may be transported directly to and from the construction sites. Thereby the drilling rig may be utilized more efficiently, and money connected to transporting the drilling rig may be saved.

The positioning jig may include a centering device. The centering device may be a rod. When establishing a high-voltage line, for example, there are great demands for exact positioning of the pylons, in both the horizontal plane and the vertical plane. The position in the horizontal plane is normally found with a GPS, and the center for the pylon and the cut-out for the pylon are typically indicated with a center mark in or on the ground.

For correct positioning of the anchoring element, the center of the positioning jig must correspond with the center of the cut-out. The centering device may include an eyehole on the positioning jig, and/or a rod and/or a bubble level. The rod may be arranged to be moved vertically in the positioning jig and may include a device for carrying the positioning jig, for example a lockable sleeve. In a lower end portion, the rod may be provided with a point. When the positioning jig is being positioned, the point of the rod is placed on the center mark. When the rod is vertical, the anchoring elements are in the correct positions for fixing to the ground. When the anchoring elements have been fixed to the ground, the positioning jig may be removed and moved to the next construction site.

The upper coupling portion and the lower coupling portion of the anchoring element may be interconnected by an articulated connection. The articulated connection may comprise a universal joint. The articulated connection makes it possible to secure the lower coupling portion to the ground in a plane that is different from the horizontal plane of the positioning jig and the drilling rig. An articulated connection is particularly advantageous on an uneven base, for example a vertical portion of a mountain or a stone, and may enable vertical fixing of the lower coupling portion.

The articulated connection may be lockable so that the upper coupling portion of the anchoring element may keep a vertical position after the positioning jig has been removed. By locking the upper coupling portion of the anchoring element in a vertical position, the connection of the drilling rig to the anchoring elements may be simplified if the connection is done vertically by the use of a crane or a helicopter.

The upper coupling portion of the anchoring element may include means for a vertical positioning of the corresponding coupling portions belonging to the positioning jig and the drilling rig. When the anchoring elements are fixed to the ground, they will most likely have different heights. To place the drilling rig at a correct angle to the ground, at least one of the anchoring elements may include means that make it possible to adjust the vertical position of at least one of the coupling portions of the positioning jig and the drilling rig. In practice, the demands for accuracy will be greater for the drilling rig than for the positioning jig. The height adjustment may be stepped and, for example, comprise a plurality of holes arranged to receive a bolt. The coupling portion of the drilling rig may include an end face arranged to rest on the bolt, and the end portion of the drilling rig may include one or more corresponding bolt holes.

At least one of the anchoring elements may comprise a device for infinitely variable height adjustment of the drilling rig. An infinitely variable height adjustment can give a more precise height adjustment than a stepped height adjustment. An infinitely variable height adjustment may comprise a clamp, a screw connection or a hydraulic cylinder. The clamp may be secured to the anchoring elements when the drilling rig is placed in a desired position. Alternatively, a portion of the coupling portion of the anchoring element may be provided with an external threaded portion arranged to receive a nut, wherein the nut may be used for both raising, lowering and holding the coupling portion of the drilling rig in the desired position. The anchoring element may include several nuts and a nut may be a counternut. In a further embodiment, the infinitely variable adjustment may comprise a hydraulic cylinder.

The anchoring element and the drilling rig may be held together with a tensioning device. The tensioning device is arranged to hold the drilling rig in a locked vertical position when the drill is being pushed into the ground, thereby subjecting the drill to a necessary force towards the ground when drilling.

The tensioning device may, for example, be a tension rod, a chain, a turnbuckle, a tensioning strap or a rope. The tensioning device may be a combination of said devices. The tensioning device may be secured to the anchoring element, to the ground or to a portion of a tree.

The invention also relates to a method for positioning a drilling rig arranged to drill in a ground, the method comprising the steps:

indicating a desired center position for the drilling rig;
providing a positioning jig and two anchoring elements;
connecting the anchoring elements to the positioning jig;
placing the center of the positioning jig in such a way that it corresponds with the desired center position for the drilling rig;
fixing the anchoring elements to the ground;
removing the positioning jig from the anchoring elements; and
connecting the drilling rig to the anchoring elements.

BRIEF DESCRIPTION OF THE DRAWINGS

In what follows, examples of preferred embodiments are described, which are illustrated in the accompanying drawings, in which.

DETAILED DESCRIPTION OF THE DRAWINGS

The figures are shown in a simplified and schematic manner, and details that are not important to elucidate what is new in the invention may have been left out in the figures. The various elements in the figures are not necessarily shown to scale. Like and corresponding elements will be indicated by the same reference numbers in the figures. Any positional indications (such as "over", "under", "between") refer to positions shown in the figures.

Figure 1:
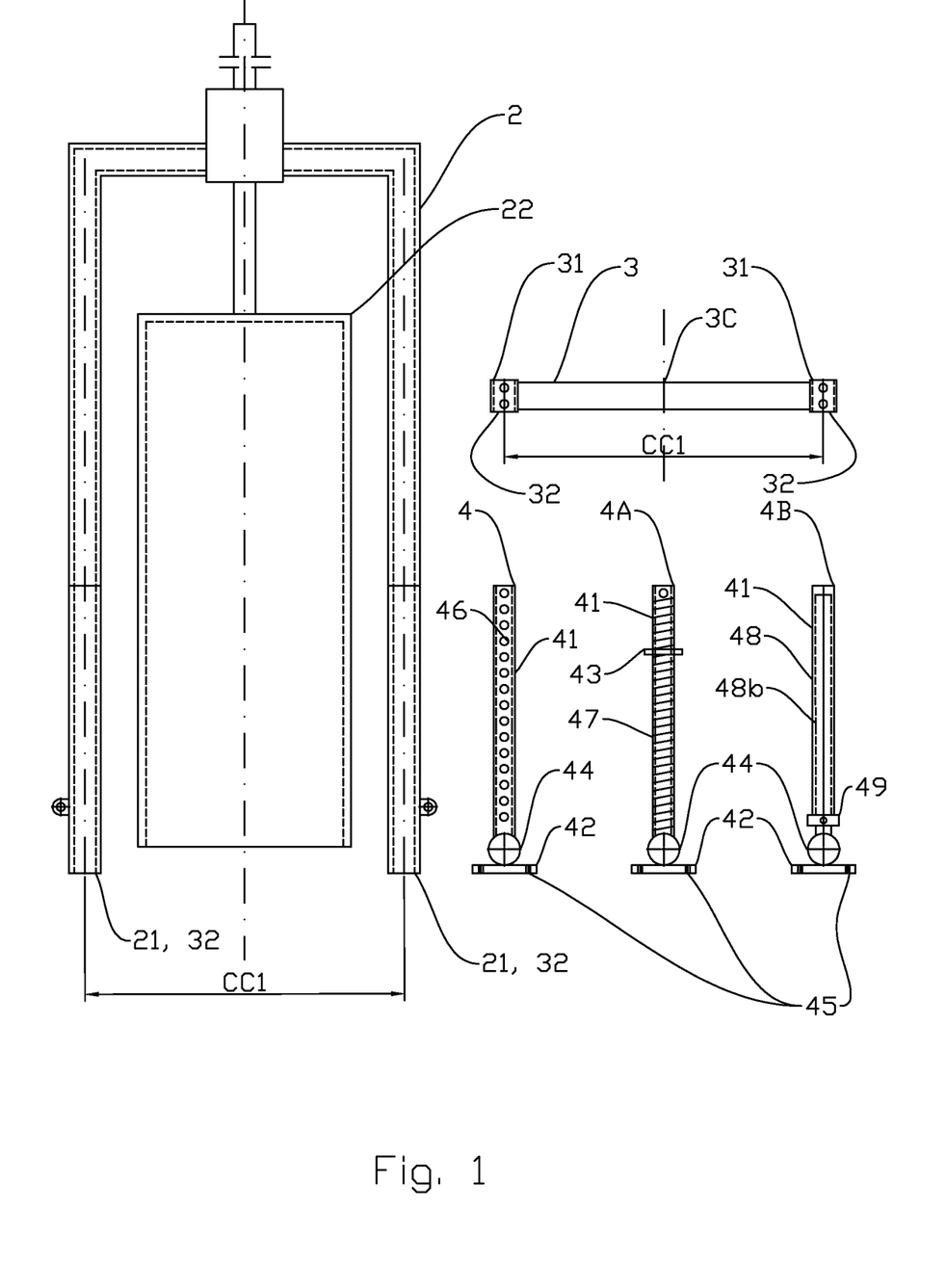
FIG. 1 shows a general view of elements for a system according to the invention, comprising a positioning jig, a drilling rig with a drill, and first, second and third anchoring elements.

FIG. 1 shows a general view of elements for a system 1 for positioning a drilling rig 2 according to the invention. The system comprises:

a positioning jig 3 including two coupling portions 31;
a drilling rig 2 including two coupling portions 21, and a drill 22; and
two anchoring elements 4.

The anchoring element 4 comprises an upper coupling portion 41 and a lower coupling portion 42, the two coupling portions 41 and 42 being interconnected via a universal joint 44. The upper coupling portion 41 is arranged to be connected to the coupling portion 31 of the positioning jig 3 and the coupling portion 21 of the drilling rig 2 by the coupling portions 31 and 21 surrounding the coupling portion 41 of the anchoring element 4. The lower coupling portion 42 of the anchoring element 4 is arranged to be releasably fixed to a ground 99 (see FIGS. 2-8).

The upper coupling portion of the anchoring element 4 comprises a stepped height adjustment, shown in the form of a plurality of holes 46 arranged to receive a bolt (not shown). In use, the end faces 32 belonging to the drilling rig 2 and the positioning jig 3 rest supportingly against the bolt. By positioning the bolt in different holes 46, the height of the drilling rig 2 and the positioning jig 3 can be adjusted. The anchoring element 4 is provided with a stepped height adjustment as described.

In an alternative embodiment 4A, the anchoring element 4 may include a mechanical infinitely variable height adjustment, shown in the form of an external threaded portion 47 with a corresponding nut 43. The end faces 32 belonging to the drilling rig 2 and the positioning jig 3 rest supportingly against the nut 43. By moving the nut axially along the threaded portion 47, the height of the drilling rig 2 and the positioning jig 3 can be adjusted.

In a further alternative embodiment 4B, the anchoring element 4 may include a hydraulic infinitely variable height adjustment, shown in the form of a hydraulic cylinder 48. The end faces 32 rest supportingly against a flange 49 attached to the cylinder 48. The lower coupling portion 42 is attached to a piston rod 48b. By hydraulically adjusting the length of stroke of the piston rod 48b, the height of the drilling rig 2 and the positioning jig 3 can be adjusted.

The center spacings CC1 between the two coupling portions 31 of the positioning jig 3 and the two coupling portions 21 of the drilling rig 2 are equal.

Figure 2:
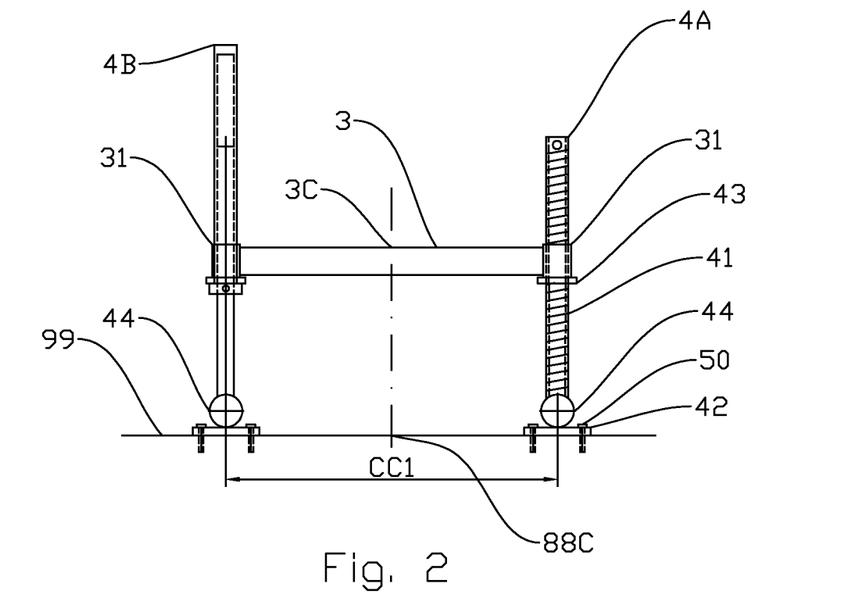
FIG. 2 shows the positioning jig viewed from the front, the positioning jig being connected to the second and the third anchoring element, and the ground being even.
Figure 3:
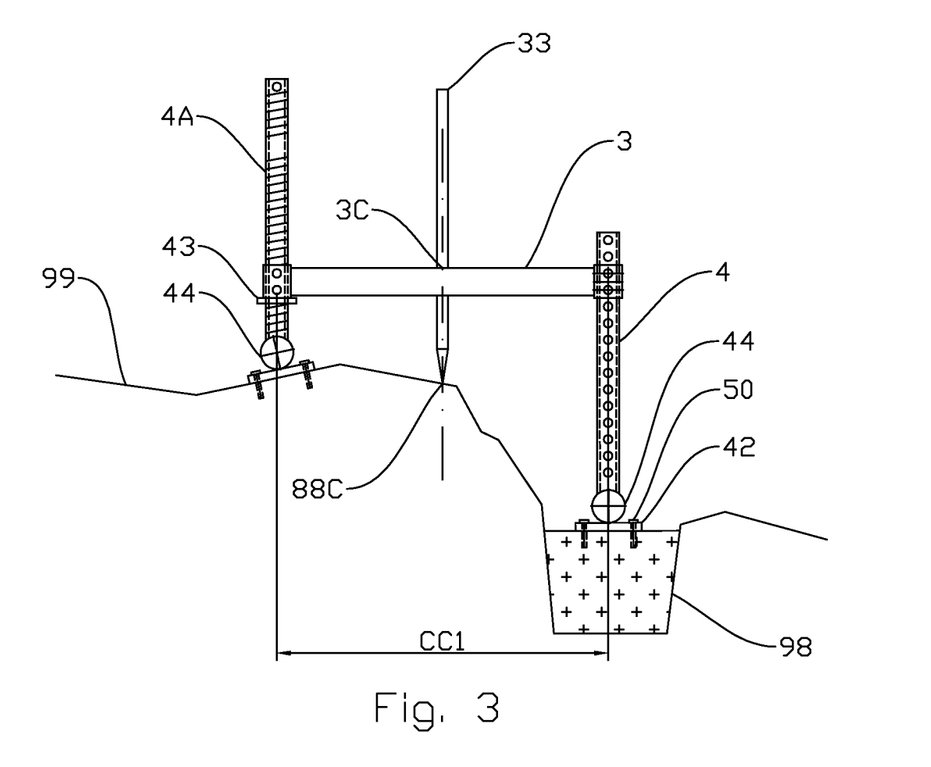
FIG. 3 shows the positioning jig connected to the first and the second anchoring element and a positioning rod, and the ground being uneven and comprising a concrete foundation.
Figure 4:
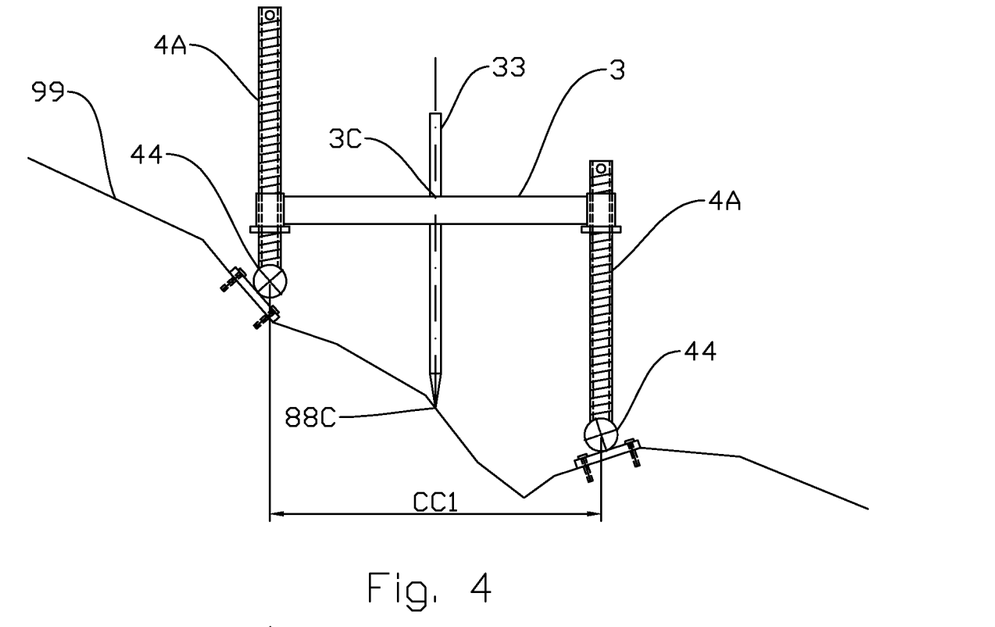
FIG. 4 shows the positioning jig connected to two second anchoring elements, and the ground being uneven.

FIGS. 2-4 show the positioning jig 3 viewed from the front, including two anchoring elements 4, 4A, 4B fixed to a flat ground 99 (FIG. 2) or uneven ground (FIGS. 3-8). The positioning jig 3 and the drilling rig 2 may be connected to identical or different anchoring elements 4, 4A, 4B.

Two anchoring elements 4, 4B, 4C are attached to the positioning jig, and the positioning jig 3 is centered over an indicated center 88C for the drilling rig. In FIGS. 3 and 4 the positioning jig 3 also includes a center rod 33. The point 33 of the center rod is positioned in the center 88C. When the positioning jig 3 is centered and the center rod 33 and the anchoring elements 4, 4B, 4C are vertical, the lower coupling portions 42 of the anchoring elements 4, 4B, 4C are fixed to the ground, for example with bolts, as shown in FIGS. 2-8.

FIG. 3 shows the anchoring element 4 fixed to the ground 99 via a concrete foundation 98. The anchoring elements 4A, 4B are fixed directly to the ground 99. The universal joint 44 makes it possible to adjust the lower coupling portions 42 in several planes so that maximum contact is achieved between the lower coupling portion 42 and the ground 99.

Figure 5:
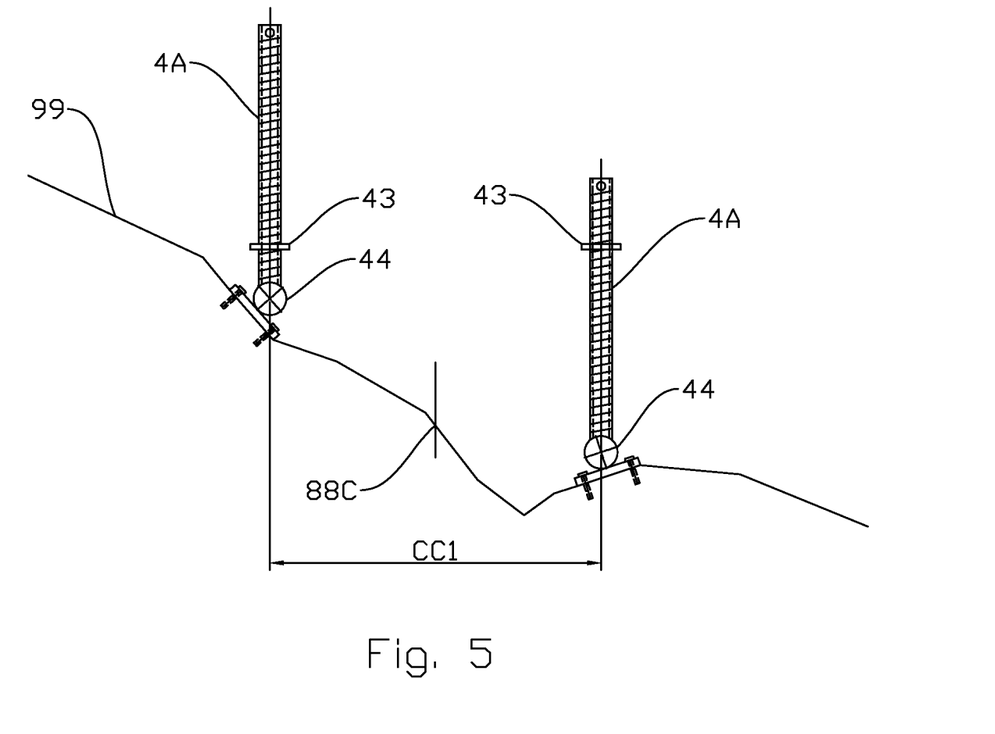
FIG. 5 shows two anchoring elements fixed to the ground and released from the positioning jig.

FIG. 5 shows two mechanically adjustable anchoring elements 4A fixed to the ground 99 after the positioning jig 3 has been removed. The center spacing CC1 is the same as for the drilling rig 2 (FIG. 1).

Figure 6:
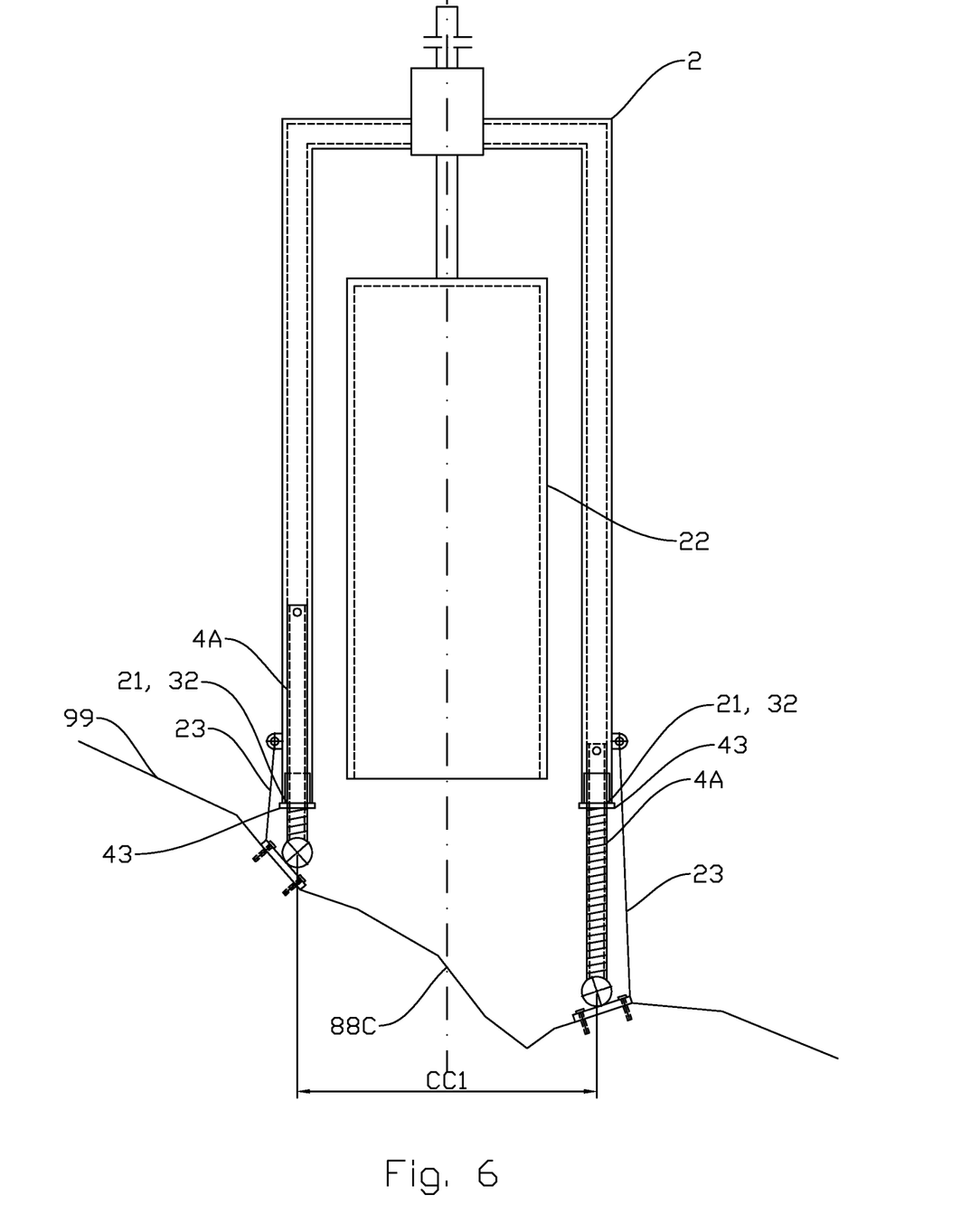
FIG. 6 shows the drilling rig connected to two anchoring elements.
Figure 7:
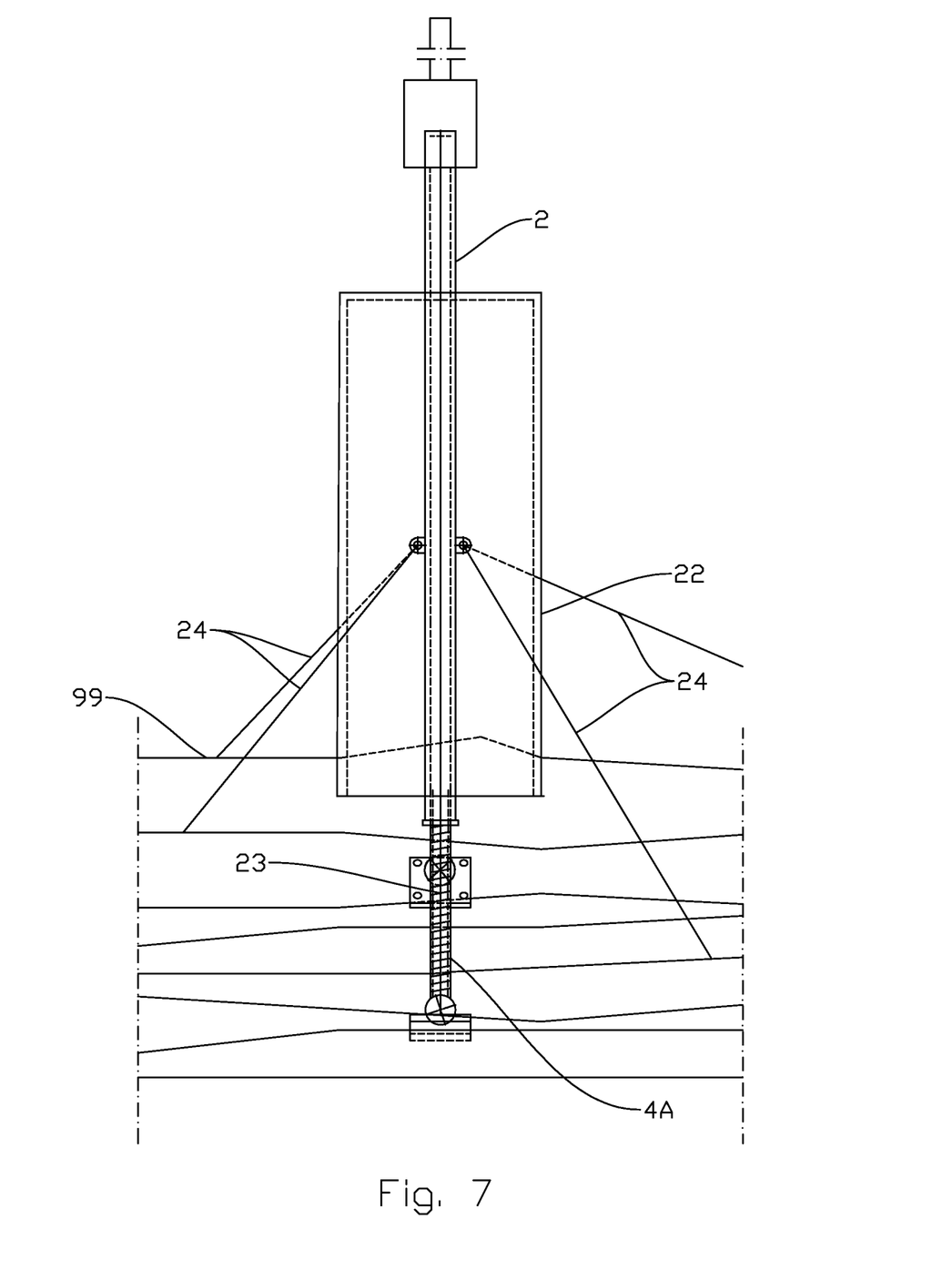
FIG. 7 shows FIG. 6 viewed from the side.

FIGS. 6 and 7 show the drilling rig 2 positioned for drilling. FIG. 6 shows the drilling rig 2 from the front. FIG. 7 shows the drilling rig 2 from the side. The two end faces 32 of the drilling rig are resting against the nuts 43. The nuts 43 are so adjusted that the drilling rig 2 is perpendicular. Two tension rods 23 connect the drilling rig 2 to the anchoring elements 42, so that the drilling ring 2 does not lift from the ground 99 when the drill 22 is being pushed into the round 99 during drilling. In an alternative embodiment, the tension rod 23 may be a chain, a tensioning strap, a turnbuckle or a combination of several elements.

In the longitudinal direction (FIG. 7), the drilling rig 2 is positioned with adjustable straps 24 anchored to the ground 99. In an alternative embodiment (not shown), the straps 24 may be anchored to a portion of a tree (not shown).

Figure 8:
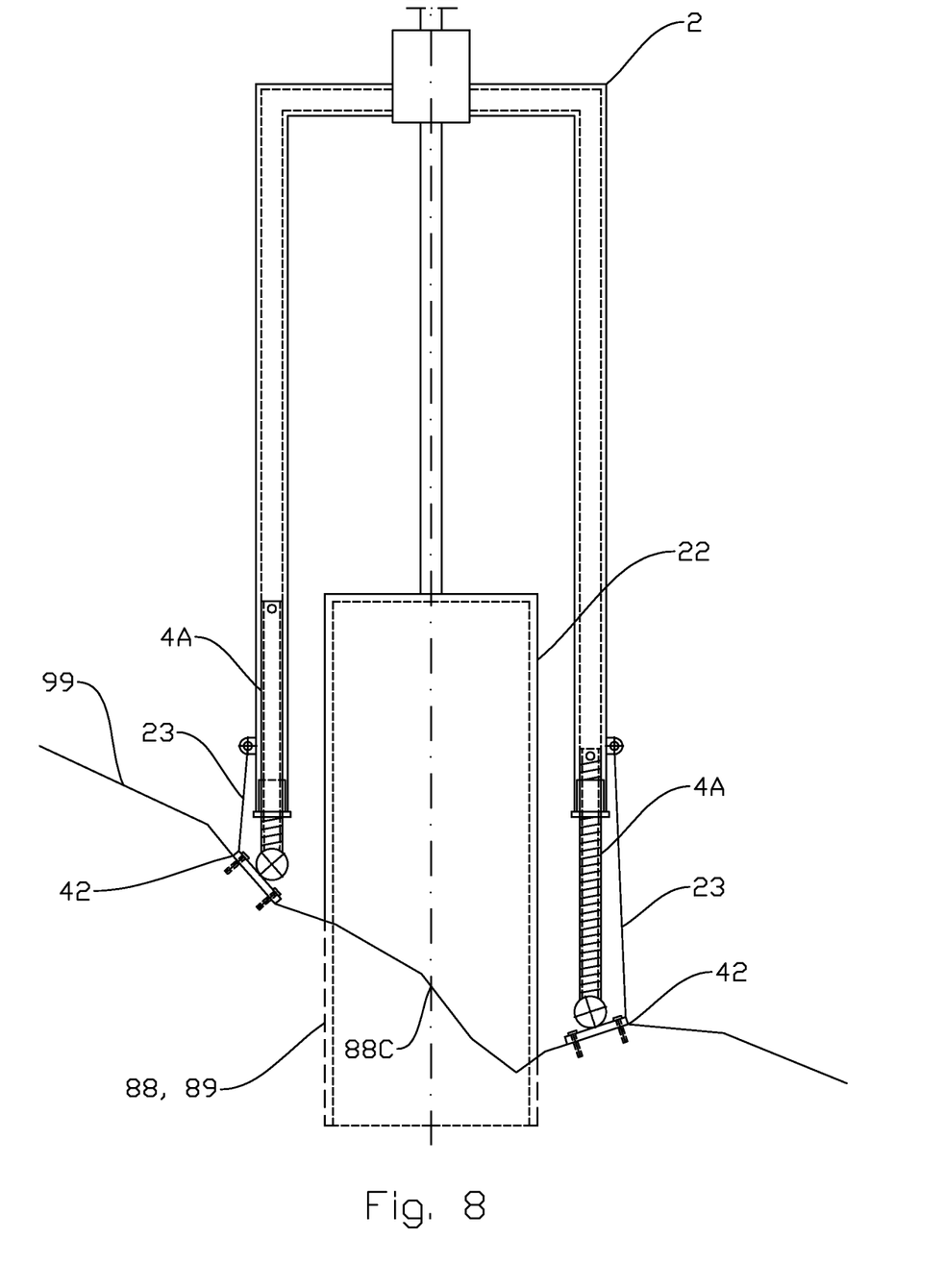
FIG. 8 shows the same as FIG. 6, but the drill is in a drilling position in the ground.

FIG. 8 shows the same as FIG. 6, but the drill 22 is in a drilling position for forming a slot 89 in the ground 99.

Figure 9:
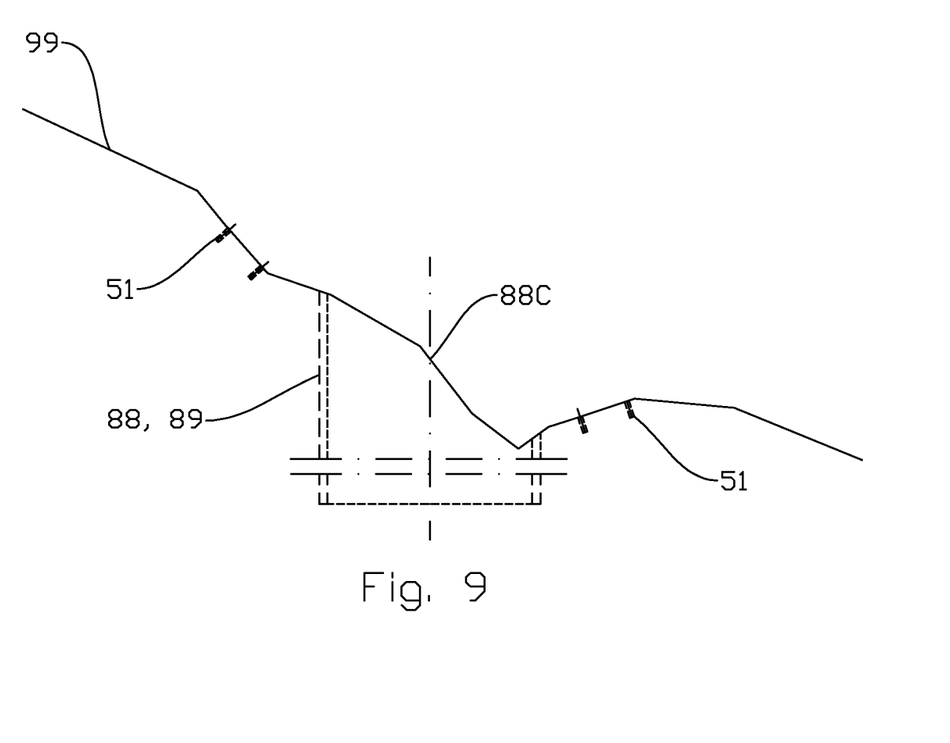
FIG. 9 shows a slot-shaped cut-out after drilling and after the system has been removed.

FIG. 9 shows the ground 99 after the slot 89 has been formed and the system 1 has been removed. After the system 1 has been removed, the only visible mark on the ground 99, apart from the slot 89, will, in the main, be the bolt holes 51.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A system for positioning a drilling rig arranged to drill in a ground, the system comprising:
   a positioning jig including at least two coupling portions;
   a drilling rig including at least two coupling portions;
   at least two anchoring elements, each including an upper coupling portion and a lower coupling portion, wherein
      the lower coupling portions of the at least two anchoring elements are arranged to be releasably fixed to the ground,
      the upper coupling portions of the at least two anchoring element are arranged to be connected to either the at least two coupling portions of the positioning jig or to the at least two coupling portions of the drilling rig,
      center spacings between the at least two coupling portions of the positioning jig and the at least two coupling portions of the drilling rig are equal, and
      the at least two coupling portions of the positioning jig and the at least two coupling portions of the drilling rig both identically correspond to the upper coupling portions of the at least two anchoring elements so that the positioning jig and the drilling rig are configured to be only alternately and not simultaneously connected to the upper coupling portions of the at least two anchoring elements.

2. The system according to claim 1, wherein the positioning jig includes a centering device.

3. The system according to claim 2, wherein the centering device is a rod.

4. The system according to claim 1, wherein the upper coupling portions and the lower coupling portions of the at least two anchoring elements are interconnected via an articulated connection.

5. The system according to claim 4, wherein the articulated connection comprises a universal joint.

6. The system according to claim 1, wherein the upper coupling portions of the at least two anchoring elements includes means for a vertical positioning of the corresponding coupling portions of the positioning jig and coupling portions of the drilling rig.

7. The system according to claim 6, wherein at least one of the at least two anchoring elements includes a device for infinitely variable height adjustment of the drilling rig.

8. The system according to claim 1, wherein the anchoring element and the drilling rig are held together with a tensioning device.

9. The system according to claim 1, wherein the at least two coupling portions of the positioning jig and the at least two coupling portions of the drilling rig each comprise sleeves configured to surround a portion of the upper coupling portions of the anchoring element.

10. A method for positioning a drilling rig arranged to drill in a ground, the method comprising:
    indicating a desired center position for the drilling rig;
    providing a positioning jig and two anchoring elements;
    connecting the anchoring elements to the positioning jig;
    placing the center of the positioning jig such that it corresponds with the desired center position for drilling rig;
    fixing the anchoring elements to the ground;
    removing the positioning jig from the anchoring elements; and
    connecting the drilling rig to the anchoring elements.

11. The method according to claim 10, further comprising operating the drilling rig to drill a hole at the center position.

12. The method according to claim 11, further comprising providing at least one tension rod connecting the drilling rig to the anchoring element for preventing the drilling rig from lifting when the drilling rig is drilling the hole.

13. The method according to claim 10, further comprising adjusting a height of the positioning jig on the anchoring elements before or after fixing the anchoring elements to the ground such that the drilling rig, when connected to the anchoring elements, is located at a desired height.

14. The method according to claim 13, wherein the height of the positioning jig is adjusted by a plurality of holes arranged to receive a bolt, wherein the positioning jig and drilling rig rest supportingly against the bolt.

15. The method according to claim 13, wherein the height of the positioning jig is adjusted by a threaded portion and a corresponding nut, wherein the positioning jig and drilling rig rest supportingly against the nut.

16. The method according to claim 13, wherein the height of the positioning jig is adjusted by a hydraulic adjustment device.

17. The method according to claim 10, wherein the ground is uneven and wherein the anchoring elements are fixed to the uneven ground.

18. The system according to claim 6A system for positioning a drilling rig arranged to drill in a ground, the system comprising:
    a positioning jig including at least two coupling portions;
    a drilling rig including at least two coupling portions;
    at least two anchoring elements, each including an upper coupling portion and a lower coupling portion, wherein
       the lower coupling portions of the at least two anchoring elements are arranged to be releasably fixed to the ground,
       the upper coupling portions of the at least two anchoring element are arranged to be connected to either the at least two coupling portions of the positioning jig or to the at least two coupling portions of the drilling rig, center spacings between the at least two coupling portions of the positioning jig and the at least two coupling portions of the drilling rig are equal, and the at least two coupling portions of the positioning jig and the at least two coupling portions of the drilling rig both correspond to the upper coupling portions of the at least two anchoring elements so that the respective upper coupling portions of the at least two anchoring elements are configured to be sequentially connected to the positioning jig and then to the drilling rig, respectively, wherein the upper coupling portions of the at least two anchoring elements includes means for a vertical positioning of the corresponding coupling portions of the positioning jig and coupling portions of the drilling rig, and wherein the means for a vertical positioning of the corresponding coupling portions of the positioning jig and coupling portions of the drilling rig comprises a plurality of holes arranged to receive a bolt, wherein the positioning jig and drilling rig rest supportingly against the bolt.

19. The system according to claim 6 A system for positioning a drilling rig arranged to drill in a ground, the system comprising:

a positioning jig including at least two coupling portions;

a drilling rig including at least two coupling portions;

at least two anchoring elements, each including an upper coupling portion and a lower coupling portion, wherein the lower coupling portions of the at least two anchoring elements are arranged to be releasably fixed to the ground, the upper coupling portions of the at least two anchoring element are arranged to be connected to either the at least two coupling portions of the positioning jig or to the at least two coupling portions of the drilling rig, center spacings between the at least two coupling portions of the positioning jig and the at least two coupling portions of the drilling rig are equal, and the at least two coupling portions of the positioning jig and the at least two coupling portions of the drilling rig both correspond to the upper coupling portions of the at least two anchoring elements so that the respective upper coupling portions of the at least two anchoring elements are configured to be sequentially connected to the positioning jig and then to the drilling rig, respectively, wherein the upper coupling portions of the at least two anchoring elements includes means for a vertical positioning of the corresponding coupling portions of the positioning jig and coupling portions of the drilling rig, and wherein the means for a vertical positioning of the corresponding coupling portions of the positioning jig and coupling portions of the drilling rig comprises a threaded portion and a corresponding nut, wherein the positioning jig and drilling rig rest supportingly against the nut.

20. The system according to claim 6 A system for positioning a drilling rig arranged to drill in a ground, the system comprising:

a positioning jig including at least two coupling portions;

a drilling rig including at least two coupling portions;

at least two anchoring elements, each including an upper coupling portion and a lower coupling portion, wherein the lower coupling portions of the at least two anchoring elements are arranged to be releasably fixed to the ground, the upper coupling portions of the at least two anchoring element are arranged to be connected to either the at least two coupling portions of the positioning jig or to the at least two coupling portions of the drilling rig, center spacings between the at least two coupling portions of the positioning jig and the at least two coupling portions of the drilling rig are equal, and the at least two coupling portions of the positioning jig and the at least two coupling portions of the drilling rig both correspond to the upper coupling portions of the at least two anchoring elements so that the respective upper coupling portions of the at least two anchoring elements are configured to be sequentially connected to the positioning jig and then to the drilling rig, respectively, wherein the upper coupling portions of the at least two anchoring elements includes means for a vertical positioning of the corresponding coupling portions of the positioning jig and coupling portions of the drilling rig, and wherein the means for a vertical positioning of the corresponding coupling portions of the positioning jig and coupling portions of the drilling rig comprises a hydraulic adjustment device.

\* \* \* \* \*